(12) United States Patent
Garcia

(10) Patent No.: US 10,224,680 B2
(45) Date of Patent: Mar. 5, 2019

(54) POWER DISTRIBUTION WINDOW UNIT

(71) Applicant: Steve Garcia, Nashua, NH (US)

(72) Inventor: Steve Garcia, Nashua, NH (US)

( * ) Notice: Subject to any disclaimer, the term of this patent is extended or adjusted under 35 U.S.C. 154(b) by 0 days.

(21) Appl. No.: 15/830,734

(22) Filed: Dec. 4, 2017

(65) Prior Publication Data

US 2018/0159283 A1    Jun. 7, 2018

Related U.S. Application Data

(60) Provisional application No. 62/429,841, filed on Dec. 4, 2016.

(51) Int. Cl.
| | | |
|---|---|---|
| *E06B 7/28* | (2006.01) | |
| *H02G 3/18* | (2006.01) | |
| *H02G 3/22* | (2006.01) | |
| *H01R 13/66* | (2006.01) | |
| *H01R 13/73* | (2006.01) | |
| *H01R 25/00* | (2006.01) | |
| *H01R 27/02* | (2006.01) | |
| *H01R 13/518* | (2006.01) | |

(52) U.S. Cl.
CPC .............. *H01R 13/73* (2013.01); *E06B 7/28* (2013.01); *H01R 13/518* (2013.01); *H01R 13/66* (2013.01); *H01R 25/006* (2013.01); *H01R 27/02* (2013.01); *H02G 3/18* (2013.01); *H02G 3/22* (2013.01); *H01R 13/6675* (2013.01)

(58) Field of Classification Search
CPC .. H01R 13/518; H01R 13/66; H01R 13/6675; H01R 13/73; H01R 25/006; H01R 27/02; E06B 7/28; H02G 3/18; H02G 3/22
USPC .................. 439/536, 638; 320/111
See application file for complete search history.

(56) References Cited

U.S. PATENT DOCUMENTS

| | | | | |
|---|---|---|---|---|
| 5,135,413 | A * | 8/1992 | Pannizzo | E06B 7/28 174/481 |
| 7,258,606 | B1 * | 8/2007 | Reid | F24F 1/027 312/101 |
| 7,909,642 | B1 * | 3/2011 | Czarnecki | H01R 25/006 439/528 |
| 8,138,430 | B1 * | 3/2012 | Ucero | H02G 3/128 174/480 |
| 9,131,619 | B2 * | 9/2015 | Moore | H05K 7/14 |
| 9,551,454 | B2 * | 1/2017 | Lipke | H02G 3/14 |
| 2008/0012423 | A1 * | 1/2008 | Mimran | H01R 25/003 307/11 |
| 2009/0156054 | A1 * | 6/2009 | Wang | H01R 13/6395 439/527 |
| 2010/0289333 | A1 * | 11/2010 | Gilpatrick | H02J 3/14 307/39 |
| 2011/0124233 | A1 * | 5/2011 | Case | H01R 13/74 439/638 |
| 2011/0151712 | A1 * | 6/2011 | Liao | H01R 13/60 439/571 |

(Continued)

*Primary Examiner* — Edwin A. Leon
*Assistant Examiner* — Oscar C Jimenez
(74) *Attorney, Agent, or Firm* — RG Patent Consulting, LLC; Rachel Gilboy

(57) ABSTRACT

A power distribution window unit is a device that can be mounted in a window that has multiple power outlets of various types on a face located inside of a building window and a power cord located on the back of the unit, which is outside of the window, and connects to a generator. The window is able to close onto the device so that there are no openings between the inside and the outside.

19 Claims, 7 Drawing Sheets

(56) References Cited

U.S. PATENT DOCUMENTS

| | | | | |
|---|---|---|---|---|
| 2011/0263152 A1* | 10/2011 | Liao | ............... | H01R 13/60 439/571 |
| 2014/0312695 A1* | 10/2014 | Czarnecki | ............ | H01R 13/447 307/41 |
| 2015/0146348 A1* | 5/2015 | Liao | ............... | H05K 5/0065 361/679.01 |
| 2018/0212383 A1* | 7/2018 | Liao | ............... | H01R 13/701 |

* cited by examiner

POWER DISTRIBUTION WINDOW UNIT

CROSS-REFERENCE TO RELATED APPLICATION

The present application is related to and claims priority from prior provisional application Ser. No. 62/429,841, filed Dec. 4, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of power distribution devices and more specifically relates to a power distribution window unit.

2. Description of the Related Art

Electric power generators are often used to provide backup electrical power to a residential or commercial building during a utility power outage. Today's commercial and residential buildings typically are designed so that they are not very functional without electricity. In addition, most devices found in businesses and homes require electricity to function or to charge the on-board battery. Each appliance or power using device has a means to connect to the utility power grid such as a power cord. Power cords use adapters of various standard configurations to connect to mating power adapters conductively attached to the utility power grid called "power outlets." Power outlets are nearly always conveniently dispersed throughout the home or business but when utility power is out and a backup generator is used, there are usually only between one and three power outlets available.

A standby generator transfers electrical power from the grid to the generator which commonly provides outlets for extension cords which may be run into the home. During power outages a user must open a window, door, or otherwise find a means to bring one or more power cord(s) from a home generator into the building. Quite often, power generators are also noisy and must be placed at a distance from the building which becomes a problem when more than one outlet is needed because it requires either multiple extension cords or some type of gang outlet. A solution is needed.

Various attempts have been made to solve the above-mentioned problems such as those found in U.S. Pat. No. 8,159,084 to Richard J. Gilpatrick; U.S. Pat. No. 7,271,346 to Ettinger et al.; and U.S. Publication No. 2011/0124233 to Case et al. This art is representative of power distribution devices. None of the above inventions and patents, taken either singly or in combination, is seen to describe the invention as claimed.

Ideally, a power distribution device should provide multiple power outlets from an electrical generator to a dwelling, and yet, would operate reliably and be manufactured at a modest expense. Thus, a need exists for a reliable power distribution window unit to avoid the above-mentioned problems.

BRIEF SUMMARY OF THE INVENTION

In view of the foregoing disadvantages inherent in the known power distribution device art, the present invention provides a novel power distribution window unit. The general purpose of the present invention, which will be described subsequently in greater detail, is to provide a multiple power outlets from an electrical generator to a dwelling without the requirement to leave a window or door open for extension cords.

A power distribution window unit for use with an electric power generator preferably comprises a housing having a front panel including an inner side surface, and a back side surface having an outer edge portion adapted to contact an interior surface of a window frame, and a window panel member movably mounted within the window frame to form a seal between the power distribution window unit and the window frame and window panel member.

The front panel is adapted to be located within an interior space of a structure housing the window frame and the window panel member. A back panel is adapted to be located outside of the structure. At least one side panel is connected between the front panel and the back panel such that the side panel(s), the front panel, and the back panel form an interior volume. There is at least one exterior outlet located on the back panel that is adapted to and electrically connected with an electric power generator.

A plurality of interior outlets are located on the front panel, are electrically connected to the at least one exterior outlet, and are adapted to provide electrical power from the electric power generator. At least one interior USB port is located on the front panel, is electrically connected to the at least one exterior outlet and adapted to provide electrical power from the electric power generator. There is preferably at least one adjustable shelf member movably attached to the front panel and is adapted to hold an electronic device thereon.

The power distribution window unit is adapted to be securely and releasably placed within the window frame of a structure and to provide electrical power between an electric power generator located outside of the structure and electrical components located inside of the structure. There are two exterior outlets that are located on the back panel that are each adapted to electrically connect with the electric power generator. There are eight interior outlets located on the front panel that are electrically connected to the exterior outlet that are each adapted to provide electrical power from the electric power generator. There are preferably two USB ports located on the front panel that are electrically connected to the exterior outlet(s) and are adapted to provide electrical power from the electric power generator.

At least one exterior USB port is located on the back panel, is electrically connected to the at least one exterior outlet, and is adapted to provide electrical power from the electric power generator. An exterior power cord is attached to the back panel that is adapted to provide electrical power from the electric power generator. A light emitting diode attached to the front panel is adapted to turn on and illuminate the interior volume of the housing when the electric power generator is turned on.

A solar panel member is located on one of the side panels and the back panel and is electrically connected with the plurality of interior outlets and the interior USB port, and is adapted to provide electrical power thereto. There are two spaced adjustable shelf members movably attached to the front panel each adapted to hold an electronic device thereon. There are four side panels connected between the front panel and the back panel, such that the four side panels, the front panel, and the back panel form a rectangular interior volume. The back panel includes an access door pivotally connected thereto and adapted to removably cover the exterior outlet(s). The front panel includes two spaced apertures therethrough, and the two spaced adjustable shelf members are slidably attached to and slide in and out of the two spaced apertures.

The combination of an electric generator and a power distribution window unit for use upon a housing structure may comprise an electric generator including an electric generating motor member, and an external power outlet that is electrically connected to the electric generating motor member that is adapted to supply electric power to the power distribution window unit, and a power distribution window unit comprising a housing having a front panel including an inner side surface, and a back side surface having an outer edge portion adapted to contact an interior surface of a window frame.

A window panel member of the housing structure is movably mounted within the window frame to form a seal between the power distribution window unit and the window frame and window panel member. The front panel is adapted to be located within the interior space of the housing structure, against the inside of the window frame and against the window panel member on at least one side and the bottom. A back panel is adapted to be located outside of the housing structure against at least one side panel and a bottom panel. The side panel(s) is connected between the front panel and the back panel, such that the at least one side panel, the front panel, and the back panel form an interior volume.

At least one exterior outlet is located on the back panel and is adapted to electrically connect with an electric power generator. A plurality of interior outlets are located on the front panel, are electrically connected to the at least one exterior outlet, and are adapted to provide electrical power from the electric power generator. At least one interior USB port is located on the front panel, is electrically connected to the exterior outlet and is adapted to provide electrical power from the electric power generator. At least one adjustable shelf member is movably attached to the front panel and is adapted to hold an electronic device thereon.

Wherein the power distribution window unit is adapted to be securely and releasably placed within the window frame of a housing structure and provide electrical power between the electric power generator located outside of the structure and electrical components located inside of the structure. There may be two exterior outlets located on the back panel that are each adapted to electrically connect with the electric power generator and there are eight interior outlets located on the front panel electrically connected to the exterior outlet(s), and are each adapted to provide electrical power from the electric power generator. There are two USB ports located on the front panel, are electrically connected to the at least one exterior outlet and are adapted to provide electrical power from the electric power generator. At least one exterior USB port located on the back panel is electrically connected to the exterior outlet(s) and is adapted to provide electrical power from the electric power generator.

An exterior power cord attached to the back panel and is adapted to provide electrical power from the electric power generator. A light emitting diode is attached to the front panel and is adapted to turn on and illuminate the interior volume of the housing when the electric power generator is turned on. A solar panel member may be located on one side panel and the back panel and is electrically connected with the plurality of interior outlets and interior USB port(s), and is adapted to provide electrical power thereto. There are two spaced adjustable shelf members movably attached to the front panel each adapted to hold an electronic device thereon. The front panel includes two spaced apertures therethrough that the two spaced adjustable shelf members are slidably attached to and slide in and out from respective spaced apertures. The back panel includes an access door pivotally connected thereto and adapted to removably cover the at least one exterior outlet.

The present invention holds significant improvements and serves as a power distribution window unit. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, power distribution window unit constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a power distribution device and more particularly to a power distribution window unit as used to provide multiple power outlets from an electrical generator to a dwelling without the requirement to leave a window or door open for extension cords.

Generally speaking, the power distribution window unit is a device that can be mounted in a window that has multiple outlets on a face located inside the window and a power cord located on the back of the unit, which is outside of the window, which connects to a generator. The window is able to close onto the device so that there are no openings between the inside and the outside.

Figure 1A:
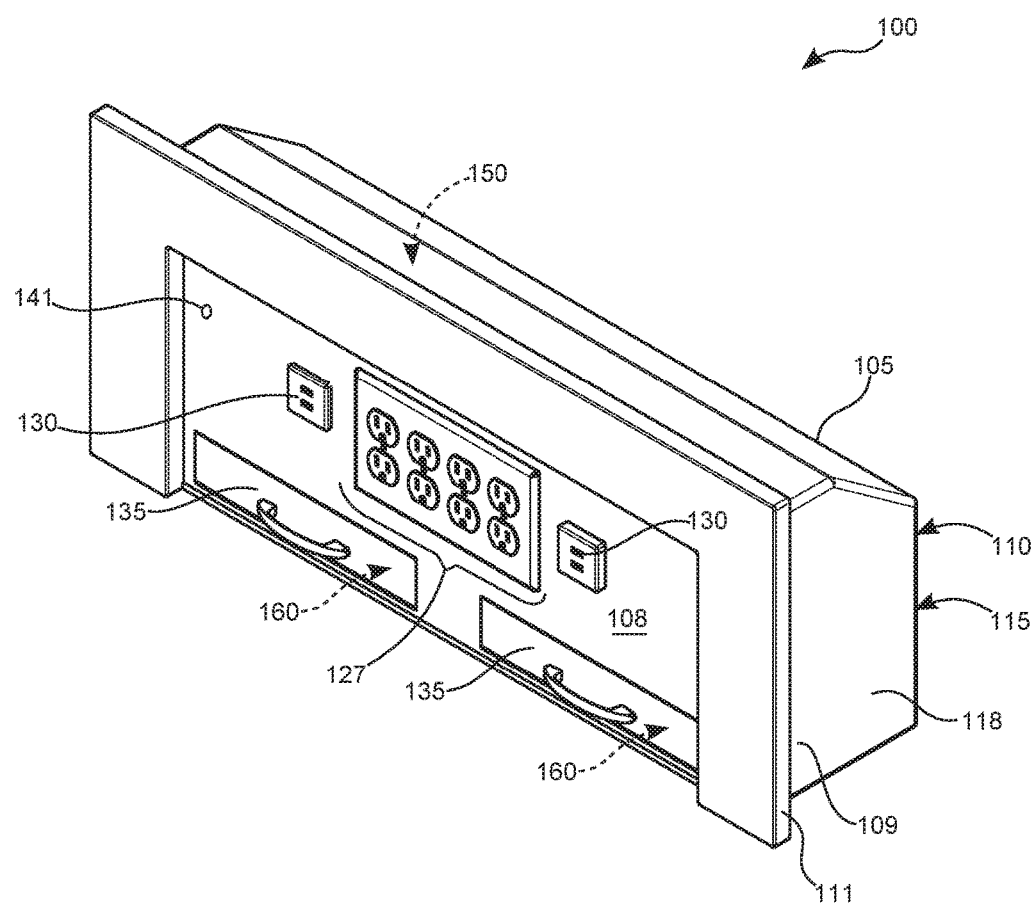
FIG. 1A shows a front perspective view illustrating a power distribution window unit according to an embodiment of the present invention.

Referring to the drawings by numerals of reference there is shown in FIG. 1A a front perspective view illustrating power distribution window unit 100 according to an embodiment of the present invention.

Power distribution window unit 100 for use with electric power generator 205 preferably comprises housing 105 having front panel 108 including inner side surface 109, and back side surface 110 having outer edge portion 111 adapted to contact an interior surface of window frame 165, and window panel member 170 movably mounted within window frame 165 to form seal 112 between power distribution window unit 100 and window frame 165 and window panel member 170.

Power distribution window unit 100 is adapted to be securely and releasably placed within window frame 165 of a structure and to provide electrical power between electric power generator 205 located outside of the structure and electrical components located inside of the structure. There are two exterior outlet(s) 124 that are located on back panel 115 that are each adapted to electrically connect with electric power generator 205. There are eight interior outlets 127 located on front panel 108 that are electrically connected to external power outlet 206 that are each adapted to provide electrical power from electric power generator 205. There are preferably two interior USB port(s) 130 located on front panel 108 that are electrically connected to exterior outlet(s) 124 and are adapted to provide electrical power from electric power generator 205.

Figure 1B:
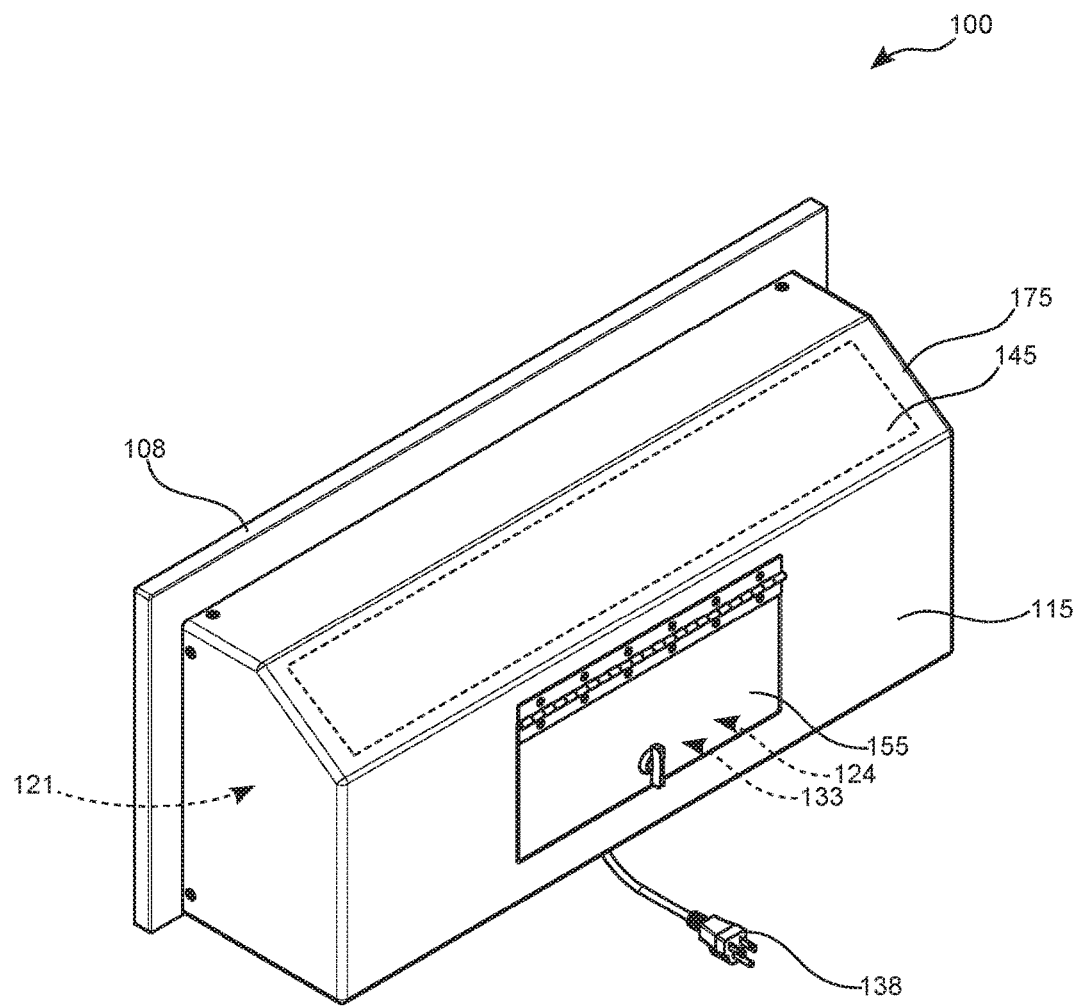
FIG. 1B is a rear perspective view illustrating a power distribution window unit according to an embodiment of the present invention of FIG. 1.

Referring now to FIG. 1B is a rear perspective view illustrating power distribution window unit 100 according to an embodiment of the present invention of FIG. 1.

At least one exterior USB port 133 is located on back panel 115, is electrically connected to the at least one exterior outlet(s) 124, and is adapted to provide electrical power from electric power generator 205. Exterior power cord 138 is attached to back panel 115 that is adapted to provide electrical power from electric power generator 205.

Figure 2A:
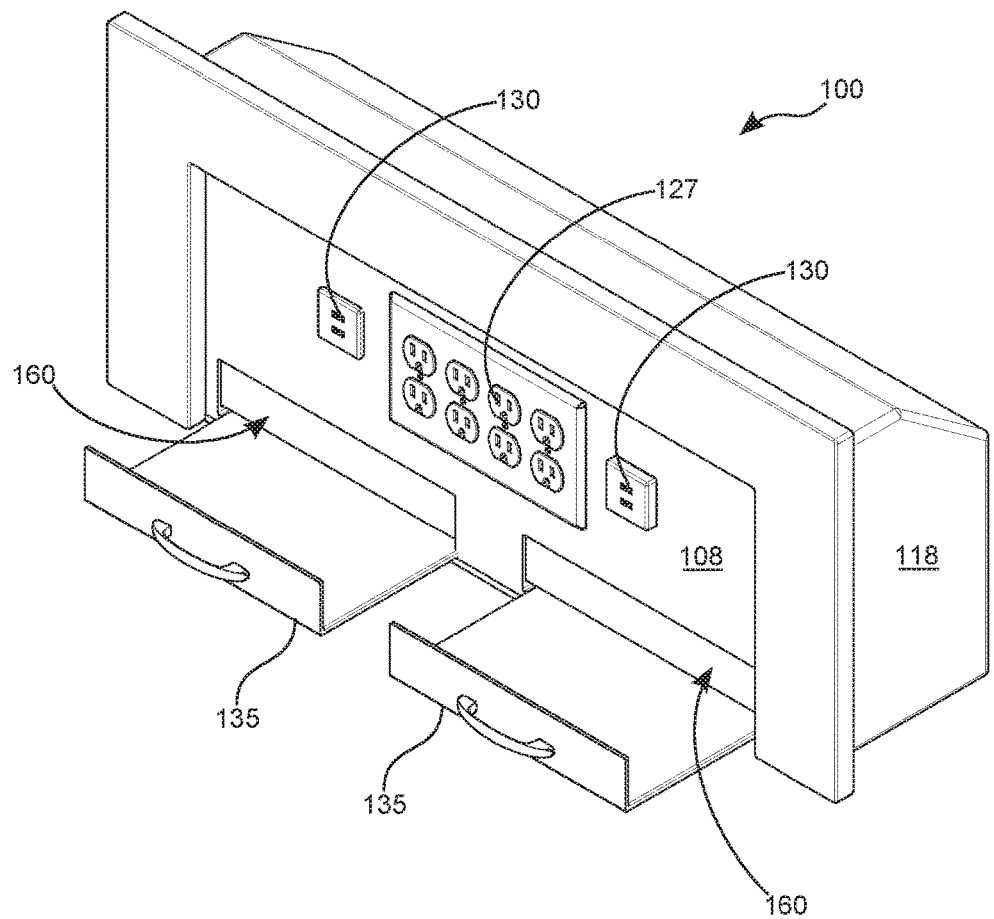
FIG. 2A is a front perspective view illustrating a power distribution window unit with the adjustable shelf members in an extended position according to an embodiment of the present invention of FIG. 1.

Referring now to FIG. 2A is a front perspective view illustrating power distribution window unit 100 with adjustable shelf member(s) 135 in an extended position according to an embodiment of the present invention of FIG. 1.

There are two spaced adjustable shelf member(s) 135 movably attached to front panel 108 each adapted to hold an electronic device thereon. There are four side panel(s) 118 connected between front panel 108 and back panel 115, such that the four side panel(s) 118, front panel 108, and back panel 115 form rectangular interior volume 150. Back panel 115 includes access door 155 pivotally connected thereto and adapted to removably cover exterior outlet(s) 124. Front panel 108 includes two spaced apertures 160 therethrough, and the two spaced adjustable shelf member(s) 135 are slidably attached to and slide in and out of the two spaced apertures 160.

Figure 2B:
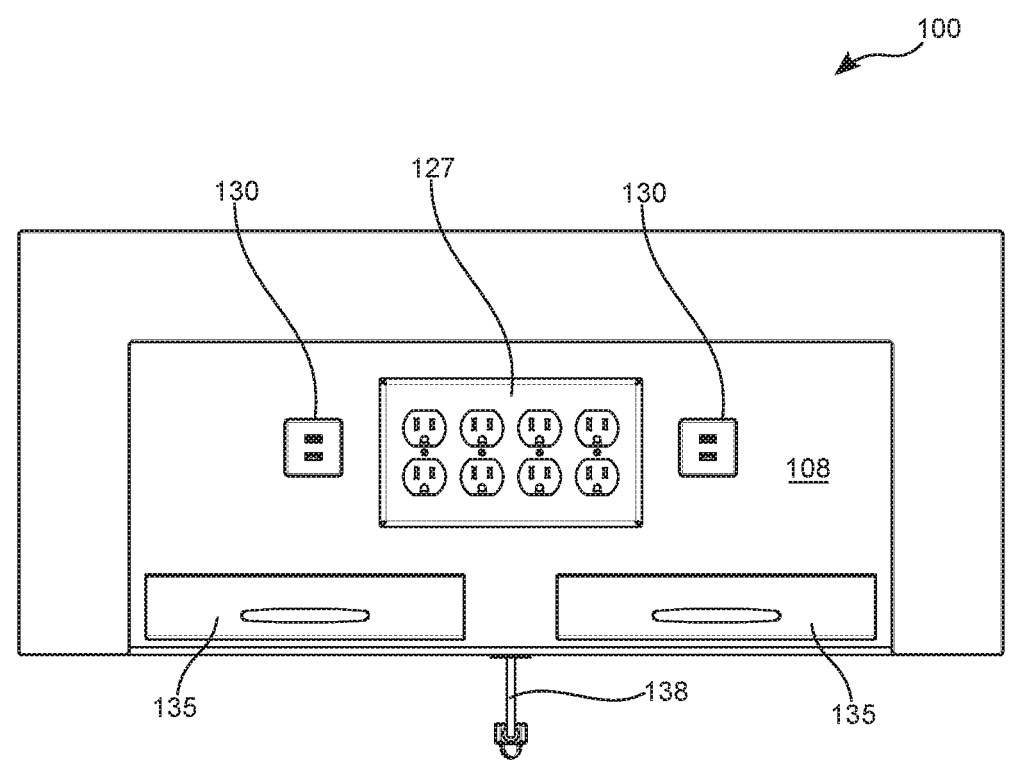
FIG. 2B is a front elevation view illustrating a power distribution window unit according to an embodiment of the present invention of FIG. 1.

Referring now to FIG. 2B is a front elevation view illustrating power distribution window unit 100 according to an embodiment of the present invention of FIG. 1.

A plurality of interior outlets 127 are located on front panel 108, are electrically connected to the at least one exterior outlet(s) 124, and are adapted to provide electrical power from electric power generator 205. At least one interior USB port(s) 130 is located on front panel 108, is electrically connected to the at least one exterior outlet(s) 124 and adapted to provide electrical power from electric power generator 205. There is preferably at least one adjustable shelf member(s) 135 movably attached to front panel 108 and is adapted to hold an electronic device thereon. Light emitting diode 141 attached to front panel 108 is adapted to turn on and illuminate interior volume 121 of housing 105 when electric power generator 205 is turned on.

Figure 3A:
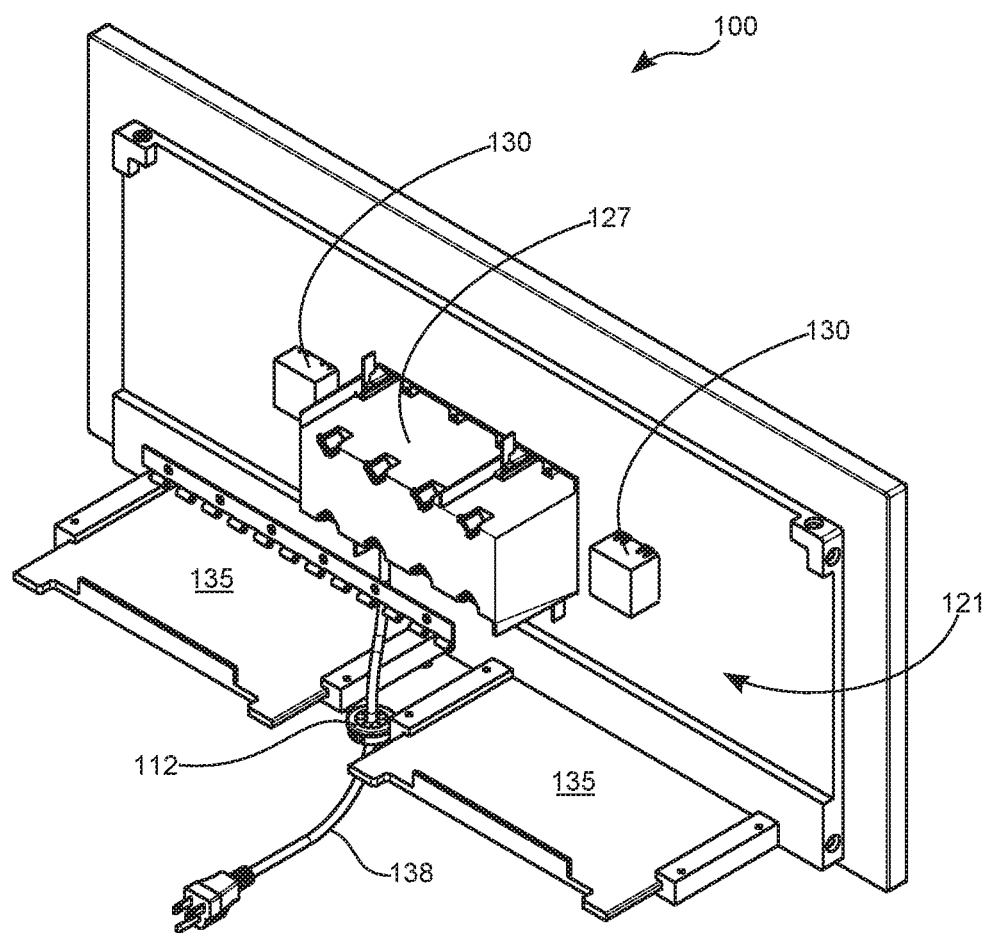
FIG. 3A is a rear perspective view illustrating power distribution window unit with the housing separated according to an embodiment of the present invention of FIG. 1.

Referring now to FIG. 3A is a rear perspective view illustrating power distribution window unit 100 with housing 105 separated according to an embodiment of the present invention of FIG. 1.

Solar panel member 145 may be located on one of side panel(s) 118 and back panel 115 and is electrically connected with the plurality of interior outlets 127 and interior USB port(s) 130, and is adapted to provide electrical power thereto. Back panel 115 preferably has sloped top portion 175 that is sloped downward at approximately 36° and in some embodiments solar panel member 145 may be located on sloped top portion 175. In an embodiment having solar panel member 145, there may also be a power storage means to supply direct current power in the event that electric power generator 205 shuts down. Solar panel member 145 may have a plug or wiring disconnect located inside housing 105 or it may be located in housing 105 side panel(s) 118.

Figure 3B:
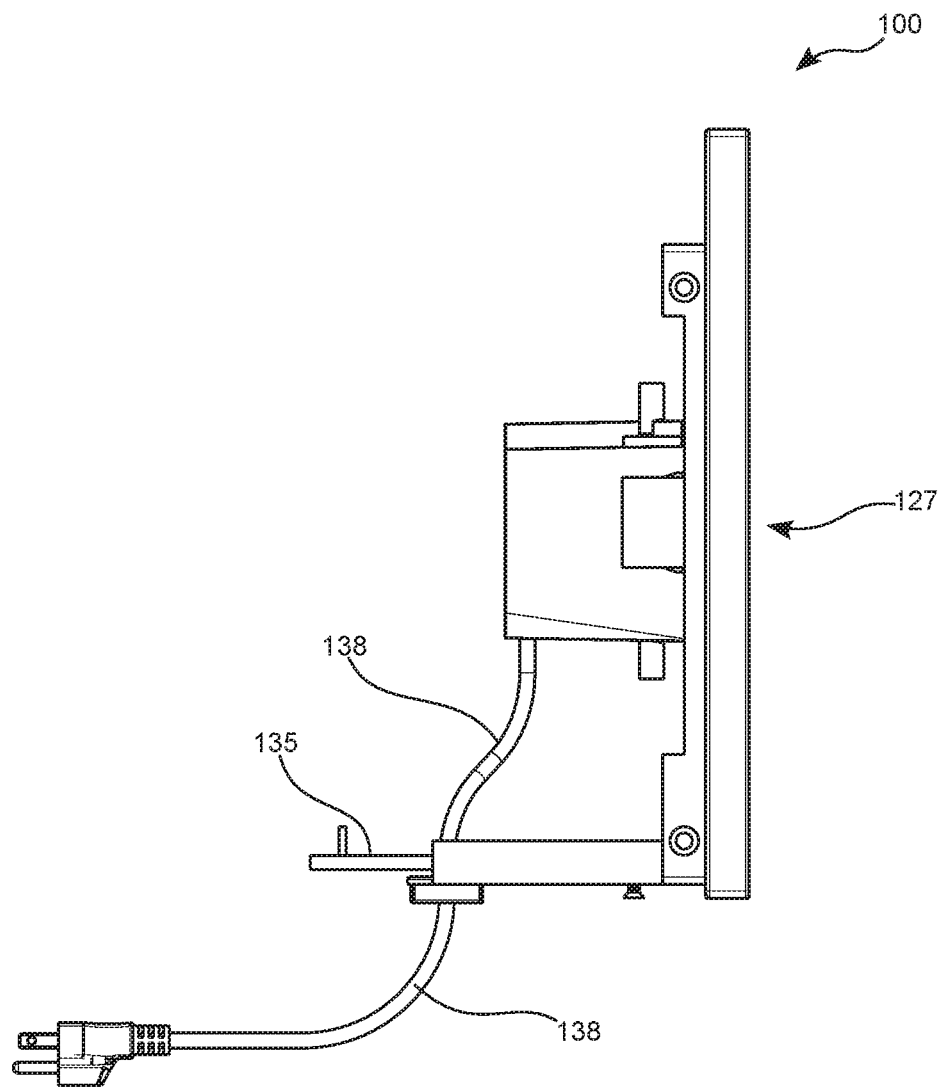
FIG. 3B is a side elevation view illustrating the power distribution window unit with the housing separated according to an embodiment of the present invention of FIG. 1.

Referring now to FIG. 3B is a side elevation view illustrating power distribution window unit 100 with housing 105 separated according to an embodiment of the present invention of FIG. 1.

Front panel 108 is adapted to be located within the interior volume of a structure having window frame 165 and window panel member 170. Back panel 115 is adapted to be located outside of the structure. At least one side panel(s) 118 is connected between front panel 108 and back panel 115 such that side panel(s) 118, front panel 108, and back panel 115 form interior volume 121. There is at least one exterior outlet(s) 124 located on back panel 115 that is adapted to and electrically connected with electric power generator 205.

Figure 4:
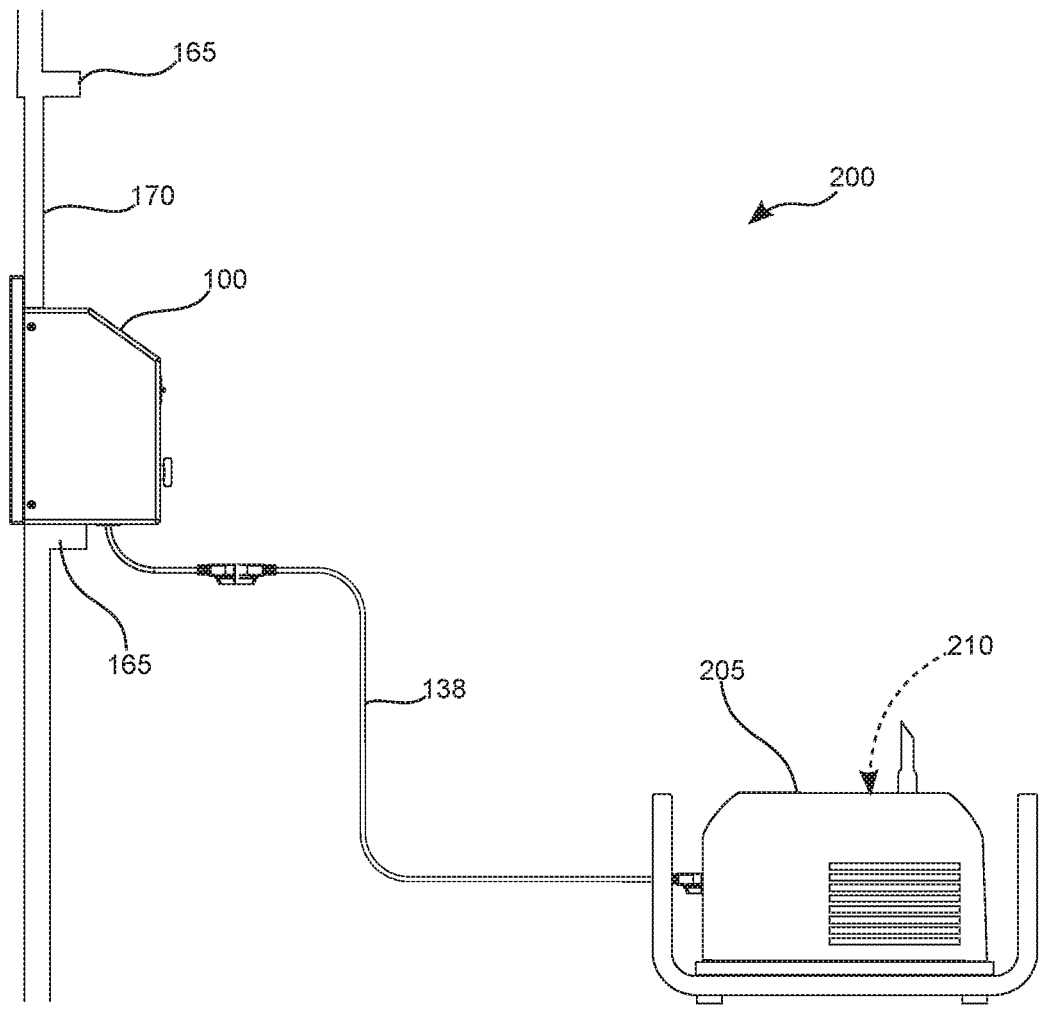
FIG. 4 is a side view illustrating the combination of an electric generator and a power distribution window unit according to an embodiment of the present invention of FIG. 1.

Referring now to FIG. 4 showing a side view illustrating combination of an electric generator and a power distribution window unit 200 according to an embodiment of the present invention of FIG. 1.

Combination of an electric generator and a power distribution window unit 200 for use upon a building structure may comprise electric power generator 205 including an electric generating motor member 210, and exterior outlet(s) 124 that is electrically connected to motor member 210 that is adapted to supply electric power to power distribution window unit 100, and power distribution window unit 100 comprising housing 105 having front panel 108 including inner side surface 109, and back side surface 110 having outer edge portion 111 adapted to contact an interior surface of window frame 165.

Window panel member 170 of the housing structure is movably mounted within window frame 165 to form seal 112 between power distribution window unit 100 and window frame 165 and window panel member 170. Front panel 108 is adapted to be located within interior volume of the housing structure, against the inside of window frame 165 and against window panel member 170 on at least one side and the bottom. Back panel 115 is adapted to be located outside of the housing structure against at least one side panel and a bottom panel. Side panel(s) 118 is connected between front panel 108 and back panel 115, such that the at least one side panel(s) 118, front panel 108, and back panel 115 form interior volume 121.

At least one exterior outlet(s) 124 is located on back panel 115 and is adapted to electrically connect with electric power generator 205. A plurality of interior outlets 127 are located on front panel 108, are electrically connected to the at least one exterior outlet(s) 124, and are adapted to provide electrical power from electric power generator 205. At least one interior USB port(s) 130 is located on front panel 108, is electrically connected to exterior outlet(s) 124 and is adapted to provide electrical power from electric power generator 205. At least one adjustable shelf member(s) 135 is movably attached to front panel 108 and is adapted to hold an electronic device thereon.

Power distribution window unit 100 is adapted to be securely and releasably placed within window frame 165 of a housing structure and provide electrical power between electric power generator 205 located outside of the structure and electrical components located inside of the structure. There may be two exterior outlet(s) 124 located on back panel 115 that are each adapted to electrically connect with electric power generator 205 and there are eight interior outlets 127 located on front panel 108 electrically connected to exterior outlet(s) 124, and are each adapted to provide electrical power from electric power generator 205. There are two interior USB port(s) 130 located on front panel 108, are electrically connected to the at least one exterior outlet(s) 124 and are adapted to provide electrical power from electric power generator 205. At least one exterior USB port 133 located on back panel 115 is electrically connected to exterior outlet(s) 124 and is adapted to provide electrical power from electric power generator 205.

Exterior power cord 138 attached to back panel 115 and is adapted to provide electrical power from electric power generator 205. Light emitting diode 141 is attached to front panel 108 and is adapted to turn on and illuminate interior volume 121 of the housing 105 when electric power generator 205 is turned on. Solar panel member 145 may be located on one side panel(s) 118 and back panel 115 and is electrically connected with the plurality of interior outlets 127 and interior usb port(s) 130, and is adapted to provide electrical power thereto. There are two spaced adjustable shelf member(s) 135 movably attached to front panel 108 each adapted to hold an electronic device thereon. Front panel 108 includes two spaced apertures 160 therethrough that the two spaced adjustable shelf member(s) 135 are slidably attached to and slide in and out from respective spaced apertures 160. Back panel 115 includes access door 155 pivotally connected thereto and adapted to removably cover the at least one exterior outlet(s) 124.

Power distribution window unit 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is:

1. A power distribution window unit for use with an electric power generator, comprising: a housing including: a front panel including; an inner side surface; and a back-side surface having an outer edge portion adapted to contact an interior surface of a window frame and a window panel member movably mounted within said window frame to form a seal between said power distribution window unit and said window frame and window panel member; wherein said front panel is adapted to be located within an interior space of a structure housing said window frame and said window panel member; a back panel; wherein said back panel is adapted to be located outside of said structure; at least one side panel; wherein said at least one side panel is connected between said front panel and said back panel, such that said at least one side panel, said front panel, and said back panel form an interior volume; at least one exterior outlet; wherein said at least one exterior outlet is located on said back panel and is adapted to be electrically connected with an electric power generator; a plurality of interior outlets; wherein said plurality of interior outlets are located on said front panel, are electrically connected to said at least one exterior outlet, and are adapted to provide electrical power from said electric power generator; at least one interior USB port; wherein said at least one interior USB port is located on said front panel, is electrically connected to said at least one exterior outlet and is adapted to provide electrical power from said electric power generator; and at least one adjustable shelf member; wherein said at least one adjustable shelf member is movably attached to said front panel and is adapted to hold an electronic device thereon; wherein said power distribution window unit is adapted to be securely and releasably placed within said window frame of a structure and provide electrical power between an electric power generator located outside of said structure and electrical components located inside of said structure; further comprising a solar panel member located on one of said side panel and said back panel, is electrically connected with said plurality of interior outlets and said at least one interior USB port, and is adapted to provide electrical power thereto.

2. The power distribution window unit of claim 1, wherein there are two exterior outlets that are located on said back panel and are each adapted to electrically connect with said electric power generator.

3. The power distribution window unit of claim 1, wherein there are eight interior outlets located on said front panel, are electrically connected to said at least one exterior outlet, and are each adapted to provide electrical power from said electric power generator.

4. The power distribution window unit of claim 1, wherein there are two USB ports located on said front panel, are electrically connected to said at least one exterior outlet and are adapted to provide electrical power from said electric power generator.

5. The power distribution window unit of claim 1, further comprising at least one exterior USB port located on said back panel, is electrically connected to said at least one exterior outlet and is adapted to provide electrical power from said electric power generator.

6. The power distribution window unit of claim 1, further comprising an exterior power cord attached to said back panel and is adapted to provide electrical power from said electric power generator.

7. The power distribution window unit of claim 1, further comprising a light emitting diode attached to said front panel and is adapted to turn on and illuminate said interior volume of said housing when said electric power generator is turned on.

8. The power distribution window unit of claim 1, wherein there are two spaced adjustable shelf members movably attached to said front panel each adapted to hold an electronic device thereon.

9. The power distribution window unit of claim 8, wherein said front panel includes two spaced apertures therethrough; and wherein said two spaced adjustable shelf members are slidably attached to and slide in and out from respective said two spaced apertures.

10. The power distribution window unit of claim 1, wherein there are four side panels connected between said front panel and said back panel, such that said four side panels, said front panel, and said back panel form a rectangular interior volume.

11. The power distribution window unit of claim 1, wherein said back panel includes an access door pivotally connected thereto and adapted to removably cover said at least one exterior outlet.

12. A combination of an electric generator and a power distribution window unit for use upon a housing structure, said combination comprising: an electric generator including: an electric generating motor member; and an external power outlet; wherein said external power outlet is electrically connected to said electric generating motor member and is adapted to supply electric power to a power distribution window unit; and a power distribution window unit, comprising: a housing including: a front panel including; an inner side surface; and a back side surface having an outer edge portion adapted to contact an interior surface of a window frame and a window panel member of said housing structure and is movably mounted within said window frame to form a seal between said power distribution window unit and said window frame and window panel member; wherein said front panel is adapted to be located within an interior space of said housing structure housing said window frame and said window panel member; a back panel; wherein said back panel is adapted to be located outside of said housing structure; at least one side panel; wherein said at least one side panel is connected between said front panel and said back panel, such that said at least one side panel, said front panel, and said back panel form an interior volume; at least one exterior outlet; wherein said at least one exterior outlet is located on said back panel and is adapted to be electrically connected with an electric power generator; a plurality of interior outlets; wherein said plurality of interior outlets are located on said front panel, are electrically connected to said at least one exterior outlet, and are adapted to provide electrical power from said electric power generator; at least one interior USB port; wherein said at least one interior USB port is located on said front panel, is electrically connected to said at least one exterior outlet and is adapted to provide electrical power from said electric power generator; and at least one adjustable shelf member; wherein said at least one adjustable shelf member is movably attached to said front panel and is adapted to hold an electronic device thereon; wherein said power distribution window unit is adapted to be securely and releasably placed within said window frame of a housing structure and provide electrical power between said electric power generator located outside of said structure and electrical components located inside of said structure; further comprising a solar panel member located on one of said side panel and said back panel, is electrically connected with said plurality of interior outlets and said at least one interior USB port, and is adapted to provide electrical power thereto.

13. The combination of claim 12, wherein there are two exterior outlets that are located on said back panel and are each adapted to electrically connect with said electric power generator; and wherein there are eight interior outlets located on said front panel, are electrically connected to said at least one exterior outlet, and are each adapted to provide electrical power from said electric power generator.

14. The power distribution window unit of claim 13, wherein there are two USB ports located on said front panel, are electrically connected to said at least one exterior outlet and are adapted to provide electrical power from said electric power generator.

15. The power distribution window unit of claim 14, further comprising at least one exterior USB port located on said back panel, is electrically connected to said at least one exterior outlet and is adapted to provide electrical power from said electric power generator.

16. The power distribution window unit of claim 12, further comprising an exterior power cord attached to said back panel and is adapted to provide electrical power from said electric power generator.

17. The power distribution window unit of claim 12, further comprising a light emitting diode attached to said front panel and is adapted to turn on and illuminate said interior volume of said housing when said electric power generator is turned on.

18. The power distribution window unit of claim 12, wherein there are two spaced adjustable shelf members movably attached to said front panel each adapted to hold an electronic device thereon; wherein said front panel includes two spaced apertures therethrough; and wherein said two spaced adjustable shelf members are slidably attached to and slide in and out from respective said two spaced apertures.

19. The power distribution window unit of claim 12, wherein said back panel includes an access door pivotally connected thereto and adapted to removably cover said at least one exterior outlet.

* * * * *